US012240195B2

(12) United States Patent
Smith

(10) Patent No.: US 12,240,195 B2
(45) Date of Patent: Mar. 4, 2025

(54) WIND TURBINE BLADE SHEAR WEBS

(71) Applicant: Vestas Wind Systems A/S, Aarhus N. (DK)

(72) Inventor: Jonathan Smith, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/714,747

(22) PCT Filed: Dec. 1, 2022

(86) PCT No.: PCT/DK2022/050253
§ 371 (c)(1),
(2) Date: May 30, 2024

(87) PCT Pub. No.: WO2023/098961
PCT Pub. Date: Jun. 8, 2023

(65) Prior Publication Data
US 2025/0033307 A1 Jan. 30, 2025

(30) Foreign Application Priority Data
Dec. 1, 2021 (DK) .............................. PA202170592

(51) Int. Cl.
*B29D 99/00* (2010.01)
*B29C 65/00* (2006.01)
(Continued)

(52) U.S. Cl.
CPC ...... *B29D 99/0028* (2013.01); *B29C 66/7212* (2013.01); *B29C 70/443* (2013.01); *B29L 2031/085* (2013.01)

(58) Field of Classification Search
CPC .................... B29D 99/0028; B29C 66/7212
See application file for complete search history.

(56) References Cited

U.S. PATENT DOCUMENTS

2017/0320275 A1   11/2017   De Waal Malefijt et al.
2017/0320276 A1   11/2017   Pedersen et al.
(Continued)

FOREIGN PATENT DOCUMENTS

EP      3573803 A1      12/2019
EP      3573803 B1 *    9/2022   ............. B29C 33/12
(Continued)

OTHER PUBLICATIONS

Danish Patent and Trademark Office, technical examination issued in corresponding DK Application No. PA 2021 70592, dated May 10, 2022.
(Continued)

*Primary Examiner* — Jason L Vaughan
*Assistant Examiner* — Amanda Kreiling
(74) *Attorney, Agent, or Firm* — Wood Herron & Evans LLP

(57) ABSTRACT

According to the present invention there is provided a mould for making a wind turbine blade shear web. The shear web comprises a longitudinally-extending web panel and a mounting flange extending along a longitudinal edge of the web panel and transverse to the web panel. The mounting flange comprises a first portion extending on a first side of the web panel and a second portion extending on a second side of the web panel. The mould comprises a longitudinally-extending main surface shaped to form the web panel, the main surface having a longitudinal edge. The mould further comprises a side surface arranged transverse to the main surface and extending downwards from the longitudinal edge of the main surface. The mould further comprises a base surface arranged transverse to the main surface and spaced from the side surface, the base surface having a first portion extending below the main surface to a first end of the base surface and a second portion extending above the main
(Continued)

surface to a second end of the base surface. The first portion of the base surface is spaced from the side surface to define a mould cavity between the side surface and the first portion of the base surface, the mould cavity being configured to form the first portion of the mounting flange. The mould further comprises a datum-forming surface extending transversely from the second end of the base surface and defining a longitudinal edge at an intersection of the second portion of the base surface and the datum-forming surface. The second portion of the base surface and the datum-forming surface are configured to form the second portion of the mounting flange, and the datum-forming surface is configured to define a longitudinal edge of the second portion of the mounting flange.

15 Claims, 6 Drawing Sheets

(51) Int. Cl.
    *B29C 70/44*        (2006.01)
    *B29L 31/08*        (2006.01)

(56) References Cited

U.S. PATENT DOCUMENTS

| 2020/0080542 A1 | 3/2020 | Monie et al. |
| 2021/0276286 A1 | 9/2021 | Hedges et al. |

FOREIGN PATENT DOCUMENTS

| WO | 2019091531 A1 | 5/2019 |
| WO | 2019178718 A1 | 9/2019 |
| WO | 2020119870 A1 | 6/2020 |
| WO | 2021228338 A1 | 11/2021 |

OTHER PUBLICATIONS

International Searching Authority, International Search Report and Written Opinion issued in corresponding PCT Application No. PCT/DK2022/050253, dated Mar. 28, 2023.

\* cited by examiner

WIND TURBINE BLADE SHEAR WEBS

TECHNICAL FIELD

The present invention relates generally to wind turbines blades and more specifically to improvements to wind turbine blade shear webs and their manufacture.

BACKGROUND

Utility-scale wind turbine blades typically include an outer shell and a longitudinally-extending spar structure configured to provide structural support to the outer shell. The spar structure may include a shear web connected between opposed spar caps or inner surfaces of the outer shell to absorb and transfer shear loads experienced by the blade in use. The shear web is an important structural component of the blade, and the position of the shear web inside the blade shell is an important factor influencing the structural performance of the blade. Accordingly, there is a need to accurately align the shear web inside the outer shell when making the blade.

In some examples it may be advantageous to form the shear web in a moulding process, such as vacuum assisted resin transfer moulding (VARTM) for example. Mounting flanges of the shear web, via which the shear web may be connected to the outer shell, may also be formed in such a moulding process. Moulding the mounting flanges and the web panel together to make a shear web with integrally formed mounting flanges has a number of advantages, both in terms of structural performance of the shear web and also in reducing the number of process steps involved in making the shear web. However, forming the mounting flanges in a moulding process can also present challenges in terms of accurately aligning the shear web inside the outer shell when making the blade.

For example, making the mounting flange in a typical shear web mould in a moulding processes such as VARTM may not form clearly defined longitudinal edges of the mounting flange. Instead, the width of the mounting flange may vary along the length of the shear web. As such, it can be challenging to correctly and accurately position the shear web inside the outer shell. In some examples, moulded mounting flanges may require trimming or other substantive finishing work at specific positions, or along their length, to facilitate alignment of the shear web inside the outer shell.

It is against this background that the present invention has been devised.

SUMMARY

According to the present invention there is provided a mould for making a wind turbine blade shear web. The shear web comprises a longitudinally-extending web panel and a mounting flange extending along a longitudinal edge of the web panel and transverse to the web panel. The mounting flange comprises a first portion extending on a first side of the web panel and a second portion extending on a second side of the web panel. The mould comprises a longitudinally-extending main surface shaped to form the web panel, the main surface having a longitudinal edge. The mould further comprises a side surface arranged transverse to the main surface and extending downwards from the longitudinal edge of the main surface. The mould further comprises a base surface arranged transverse to the main surface and spaced from the side surface, the base surface having a first portion extending below the main surface to a first end of the base surface and a second portion extending above the main surface to a second end of the base surface. The first portion of the base surface is spaced from the side surface to define a mould cavity between the side surface and the first portion of the base surface, the mould cavity being configured to form the first portion of the mounting flange. The mould further comprises a datum-forming surface extending transversely from the second end of the base surface and defining a longitudinal edge at an intersection of the second portion of the base surface and the datum-forming surface. The second portion of the base surface and the datum-forming surface are configured to form the second portion of the mounting flange, and the datum-forming surface is configured to define a longitudinal edge of the second portion of the mounting flange.

The mould advantageously facilitates the manufacture of a shear web comprising a mounting flange where a second portion of the mounting flange has a clearly defined longitudinal edge. Accordingly, a shear web manufactured in the mould may facilitate improved accuracy when positioning the shear web inside an outer shell to make a wind turbine blade. In some examples, the mould may advantageously form a shear web comprising a mounting surface and a datum feature that extends transverse to the mounting surface. The datum feature may define the longitudinal edge of the second portion of the mounting flange.

It will be appreciated that the configuration of the first and second portions of the base surface is defined in relation to the main surface of the mould. In a typical orientation, the main mould surface may be substantially horizontal. As such, the first portion of the base surface is referred to as "extending below", and the second portion of the base surface is referred to as "extending above", in relation to a substantially horizontal main surface with the mould in a typical orientation.

In some examples, the base surface may be substantially planar. As such, the base surface may be configured to form a substantially planar mounting surface of the mounting flange. In some examples, the first portion of the base surface may therefore be substantially co-planar with the second portion of the base surface. In other examples, the first and second portions of the base surface may be angled relative to one another. Such a configuration may be used to form a mounting flange having a non-planar mounting surface configured to approximate a curvature of an inner surface of a wind turbine blade outer shell to which the shear web may be connected.

The first end of the base surface may be connected to the side surface via an end surface configured to define a longitudinal edge of the first portion of the mounting flange. As such, the end surface and datum-forming surface may together ensure that a total width of the mounting flange formed in the mould is clearly defined.

The end surface may also help to ensure that a minimum separation between the side surface and the first portion of the base surface is clearly defined and maintained. This in turn may help to ensure that the side surface and first portion of the base surface are spaced apart sufficiently to allow mounting flange materials, such as fibrous material and resin, to fill the mould cavity when making the shear web. In particular, the inclusion of an end surface may facilitate an increased level of certainty that fibrous material arranged in the mould cavity extends across substantially all of the side surface and the first portion of the base surface when making the shear web. This in turn may reduce the risk of resin-rich areas forming in the first portion of the mounting flange when making the shear web.

In some examples, the first portion of the base surface may be substantially parallel with the side surface. As such, the separation between the side surface and the first portion of the base surface may be substantially constant in some examples. The mould cavity may therefore comprise a substantially constant width in such examples. Accordingly, the mould may form a shear web comprising a mounting flange having a first portion with a substantially constant thickness.

In some other examples, the first portion of the base surface may be angled relative to the side surface. For example, the separation between the side surface and the first portion of the base surface may decrease going from the main surface of the mould towards the first end of the base surface. Accordingly, the mould cavity may taper in width. The mould may therefore form a shear web comprising a mounting flange having a first portion with a thickness that tapers towards the longitudinal edge of the first portion of the mounting flange.

The datum-forming surface may be angled at 90 degrees or less relative to the second portion of the base surface. In other words, the mould may be configured such that an angle defined between the datum-forming surface and the second portion of the base surface is no greater than 90 degrees. Such a configuration may help to ensure that the edge of the second portion of the mounting flange, which is defined by the datum-forming surface, defines a maximum width of the mounting flange. Such a mould configuration may therefore facilitate increased accuracy when positioning the shear web inside an outer shell of a wind turbine blade.

In some examples, the datum-forming surface may be angled at a strictly acute angle relative to the second portion of the base surface. Such a configuration further ensures that the edge of the second portion of the mounting flange and also the width of the mounting flange are clearly defined.

The datum-forming surface preferably extends longitudinally along the second portion of the base surface. As such, the datum-forming surface is preferably configured to form a datum feature of the mounting flange that extends longitudinally along the second portion of the mounting flange.

The mould may comprise a main mould portion defining the main surface. The mould may comprise one or more separable mould elements defining at least one of the base surface and the datum-forming surface. The one or more separable mould elements may facilitate an easier de-moulding process when removing the shear web from the mould. Further, separable mould elements may facilitate the manufacture of shear web configurations with geometry that cannot be manufactured in a single-piece mould. For example, some shear web configurations comprising flange portions extending from the web panel at acute angles may be difficult or impossible to remove from a single-piece mould. Conversely, providing one or more portions of the mould as separable mould elements may facilitate the removal of such shear webs from the mould after moulding.

The term "separable mould element" refers to a mould element that is separable from the main mould portion. In some examples the separable mould elements may be removably attached to the main mould portion. For example, one or more separable mould elements may be attached to the main mould portion using fastening means, such as bolts or screws.

In some examples, a single separable mould element may define the base surface and the datum-forming surface. Such a configuration may advantageously minimise the process steps involved in assembling the mould, and may also reduce the number of joint gaps between parts of the mould into which resin may escape during moulding. Such a configuration may therefore reduce the amount of de-flashing required after making a shear web in the mould.

In some examples, the end surface may be defined by a separable mould element. For example, each of the base surface, the datum-forming surface and the end surface may be defined by one or more separable mould elements. Such a configuration may increase the number of different shear web configurations that can be manufactured in the mould. For example, the geometry of a mounting flange formed by the mould may be varied by varying the position of the or each different mould element relative to the main mould portion. Such a configuration may therefore reduce the number of different moulds required for forming different shear webs in a blade manufacturing facility. Similarly, different separable mould elements may be used with the same main mould portion to form shear webs having differently configured mounting flanges.

In some other examples the end surface may be defined by the main mould portion. Such a configuration may reduce the number of joint gaps between parts of the mould into which resin may escape during moulding. Such a configuration may therefore reduce the amount of de-flashing required after making a shear web in the mould.

According to the present invention there is provided a method of making a wind turbine blade shear web. The shear web comprises a longitudinally-extending web panel and a mounting flange extending along a longitudinal edge of the web panel and transverse to the web panel. The mounting flange comprises a first portion extending on a first side of the web panel and a second portion extending on a second side of the web panel. The method comprises providing a mould comprising a longitudinally-extending main surface having a longitudinal edge, a side surface arranged transverse to the main surface and extending downwards from the longitudinal edge of the main surface, and a base surface arranged transverse to the main surface and spaced from the side surface. The base surface has a first portion extending below the main surface to a first end of the base surface, and a second portion extending above the main surface to a second end of the base surface. The first portion of the base surface is spaced from the side surface to define a mould cavity between the base surface and the side surface. The mould further comprises a datum-forming surface extending transversely from the second end of the base surface and defining a longitudinal edge at an intersection of the second portion of the base surface and the datum-forming surface. The method further comprises arranging one or more layers of fibrous material on the main surface of the mould to form the web panel, and arranging one or more layers of fibrous material in the mould cavity between the side surface and the first portion of the base surface to form the first portion of the mounting flange. The method further comprises arranging one or more layers of fibrous material against the second portion of the base surface and the datum-forming surface to form the second portion of the mounting flange. At least one layer of fibrous material is arranged to extend across the longitudinal edge at the intersection of the second portion of the base surface and the datum-forming surface. The method further comprises integrating the fibrous material with resin to form a shear web comprising an integrally formed mounting flange.

It will be appreciated that in the context of this disclosure, the term "arranging/arranged against" is not limited to arranging fibrous material in direct contact with a surface. Instead "arranging/arranged against" also encompasses examples where fibrous material is arranged in indirect contact with a surface, such as examples including a separation layer between the fibrous material and a surface, for example.

In some examples, the first end of the base surface may be connected to the side surface via an end surface configured to define a longitudinal edge of the first portion of the mounting flange. In such an example, the method may comprise arranging fibrous material in the mould cavity to extend up to the end surface, i.e. fully extending across the side surface and up to the end surface. Such an arrangement of fibrous material may minimize the risk of resin rich areas forming in the first portion of the mounting flange when making the shear web.

The mould may comprise a main mould portion defining the main surface, and one or more separable mould elements defining at least one of the base surface and the datum-forming surface. The method may comprise arranging the or each separable mould element with the main mould portion prior to arranging the one or more layers of fibrous material against the second portion of the base surface and the datum-forming surface.

Arranging one or more layers of fibrous material in the mould cavity may comprise first arranging one or more layers of fibrous material with the side surface of the mould before subsequently arranging the or each separable mould element with the main mould portion such that said fibrous material is sandwiched in the mould cavity between the side surface and first portion of the base surface. A process in this order may advantageously facilitate improved accuracy when arranging the fibrous material with the side surface to form the first portion of the mounting flange. Such a method may provide an increased certainty that fibrous material arranged in the mould cavity extends across substantially all of the side surface, which may reduce the risk of resin-rich areas forming in the first portion of the mounting flange when making the shear web.

The method may comprise arranging at least a portion of one or more base layers of fibrous material with the one or more layers of fibrous material arranged with the side surface of the mould. The method may comprise subsequently arranging the or each separable mould element with the main mould portion. The method may comprise subsequently arranging the or each base layer of fibrous material with the base surface to extend between the first and second ends of the base surface. A process in this order may advantageously facilitate improved accuracy when arranging the base layers of fibrous material.

Inclusion of one or more base layers of fibrous material may advantageously form a shear web comprising a substantially smooth or even mounting surface because the base layer(s) bridges between the first and second portions of the mounting flange. This may additionally reduce the risk of a resin rich area forming between the first and second portions of the mounting flange.

In some examples, the or each base layer of fibrous material may be arranged to extend across substantially the entire base surface, for example from the first end of the base surface to the second end of the base surface. Arranging the or each base layer of fibrous material in such a way may advantageously form a shear web having a mounting flange with fibrous material extending across substantially the whole width of the mounting flange. This may additionally result in a shear web having a substantially smooth or even mounting surface.

It will be appreciated that in examples including the arrangement of one or more base layers of fibrous material, the or each base layer of fibrous material is preferably arranged with the second portion of the base surface prior to arranging the one or more layers of fibrous material against the second portion of the base surface and the datum-forming surface to form the second portion of the mounting flange.

Arranging one or more layers of fibrous material against the second portion of the base surface and the datum-forming surface may further comprise arranging at least one layer of fibrous material to run out of the mould beyond a distal edge of the datum-forming surface. In the context of the present disclosure the "distal edge of the datum-forming surface" refers to the edge of the datum-forming surface furthest from the base surface.

Running one or more layers of fibrous material out of the mould beyond the distal edge of the datum-forming surface may advantageously help to ensure that fibrous material is arranged all of the way up to and across the longitudinal edge at the intersection of the second portion of the base surface and the datum-forming surface, thereby ensuring that the mould forms a second portion of the mounting flange having a clearly defined edge.

Further, the second portion of the base surface extends upwards from the main surface of the mould with the mould in a typical orientation. As such, the datum-forming surface may define one of the highest portions of the mould. Accordingly, resin used to integrate the fibrous material may be motivated away from the datum-forming surface and second end of the of the base surface under the influence of gravity. Running fibrous material out of the mould beyond the distal edge of the datum-forming surface advantageously ensures that fibrous material extends across substantially all of the datum-forming surface. This ensures that fibrous material is present at the high point of the mould which may help to retain resin against the force of gravity throughout a curing process. As such, running one or more layers of fibrous material out of the mould may help to ensure that the fibrous material forming the second portion of the flange is thoroughly wetted up to and beyond the longitudinal edge at the intersection of the second portion of the base surface and the datum-forming surface.

The method may further comprise arranging at least one layer of fibrous material to extend over a portion of both the main surface and the side surface. The method may further comprise arranging at least one layer of fibrous material to extend over a portion of both the main surface and the second portion of the base surface. Such an arrangement of fibrous material may advantageously form a shear web comprising substantially continuous load paths between the main panel of the shear web and the first and second portions of the mounting flange. Additionally, such an arrangement of fibrous material may reduce the risk of resin rich areas between the mounting flange and the web panel.

In some examples, the method may comprise arranging filler material between the fibrous material arranged to form the first portion and the mounting flange and the fibrous material arranged to form the second portion of the mounting flange. The filler material may reduce the risk of resin rich areas forming between the fibrous material in the first and second portions of the mounting flange. The filler material may comprise one or more of foam and/or polystyrene and/or balsa and/or reinforcing fibres and/or cured or uncured adhesive. In preferred examples, the filler material may comprise a rope of fibres, preferably glass fibres.

In examples where filler material is including when laying up the fibrous material in the mould, the filler material is preferably arranged on top of the fibrous material arranged to form the first portion before the fibrous material is arranged in the mould to form the second portion. Such a process facilitates an accurate arrangement of filler material and reduces wrinkling of the fibrous material. In some examples, the filler material may be arranged in a space defined between the or each base layer of fibrous material, the fibrous material arranged to form the first portion of the mounting flange, and the fibrous material arranged to form the second portion of the mounting flange.

In some examples, integrating the fibrous material with resin may comprise wetting the fibrous material with resin, for example in a resin infusion process, and subsequently curing the resin. Additionally or alternatively, in some examples the method may comprise arranging one or more layers of pre-preg fibrous material, i.e. fibrous material pre-impregnated with resin. As such, the fibrous material may be pre-preg fibrous material in some examples. Integrating the fibrous material may comprise curing resin in the pre-preg fibrous material.

The method may further comprise arranging a vacuum bag over the layers of fibrous material in the mould and sealing the vacuum bag to the mould such that a second mould cavity is defined between the vacuum bag, the main surface, the base surface, and the datum-forming surface, the second mould cavity being configured to form the second portion of the mounting flange. The method may comprise a vacuum assisted resin transfer moulding (VARTM) process in which resin is introduced to the first and second mould cavities under vacuum pressure to infuse the fibrous material arranged in the mould.

According to the present invention there is provided a wind turbine blade comprising an outer shell and a shear web connected between inner surfaces of the outer shell. The shear web comprises a longitudinally-extending web panel and a mounting flange extending along a longitudinal edge of the web panel and transverse to the web panel. The mounting flange comprises a first portion extending on a first side of the web panel and a second portion extending on a second side of the web panel. The first and second portion of the mounting flange together define a mounting surface for connection to an inner surface of the outer shell. The second portion of the mounting flange comprises a datum feature extending transverse to the mounting surface and defining an edge of the second portion of the mounting flange.

The datum feature preferably extends longitudinally along the shear web to define a longitudinal edge of the second portion of the mounting flange. In some examples, the datum feature may extend along substantially the entire length of the shear web. As such, the datum feature is preferably configured to facilitate accurate alignment of the shear web inside the outer shell at all points along the length of the shear web.

The datum feature may be angled at 90 degrees or less relative to the second portion of the mounting flange. In other words, an angle defined between the datum feature and the second portion of the mounting flange may be no greater than 90 degrees. As such, the edge of the second portion of the mounting flange defined by the datum feature preferably defines a maximum width of the mounting flange.

The datum feature preferably extends away from the mounting surface. For example, the datum feature preferably extends away from the inner surface of the outer shell, i.e. towards an interior of the blade. As such, the datum feature may facilitate improved alignment of the shear web inside the outer shell without interfering with, or adversely affecting, the connection between the mounting surface and the inner surface of the outer shell.

The first portion of the mounting flange may be substantially planar. By "substantially planar" it will be understood that the first portion of the mounting flange may extend in a single direction. As such, the first portion of the mounting flange may not comprise a transversely-extending datum feature. Such a configuration may facilitate de-moulding the shear web and mounting flange from the mould when making the shear web.

The datum feature may be integrally formed with the second portion of the mounting flange. Advantageously, the provision of a datum feature may therefore not require additional process steps when making the shear web. Further, an integrally formed datum feature may have the requisite strength and robustness to withstand knocks and abutment with aligning features/guide structures when positioning the shear web inside the outer shell of the blade. Further still, an integrally formed datum feature may be more robust throughout the lifetime of the blade, for example withstanding loading cycles as the shear web is loaded and unloaded without separating from the mounting flange to form loose debris which could damage the inside of the outer shell.

The wind turbine blade may further comprise a web locator arranged on the inner surface of the outer shell. The web locator may comprise a first guide structure. The datum feature may abut the first guide structure to accurately align the shear web inside the outer shell of the blade.

Additionally, the web locator may comprise a second guide structure. A flange-receiving gap may be defined between the first and second guide structures. The shear web mounting flange may be located in the flange-receiving gap. The datum feature may abut one of the first or second guide structures. The web locator may help to accurately align the shear web inside the outer shell when making the wind turbine blade.

The wind turbine blade may comprise one or more reinforcing structures. For example, the wind turbine blade may comprise one or more reinforcing structures integrated with the outer shell. The or each reinforcing structure may be a longitudinally extending spar cap. Alternatively or additionally, the wind turbine blade may comprise one or more reinforcing structures connected to an inner surface of the outer shell. It will be appreciated that where reference is made herein to attachment of a shear web to an inner surface of the outer shell, such references equally include attachment to an inner surface of a reinforcing structure connected to the outer shell.

In examples where the blade comprises one or more reinforcing structures, the web panel of the shear web is preferably substantially aligned with the reinforcing structure. As such, the wind turbine blade may comprise a web locator arranged on the inner surface of the outer shell such that the web panel is substantially aligned with the reinforcing structure when the datum feature of the shear web abuts a guide structure of the web locator.

BRIEF DESCRIPTION OF THE DRAWINGS

Examples of the present invention will now be described by way of non-limiting example only, with reference to the accompanying figures, in which.

DETAILED DESCRIPTION

Figure 1:
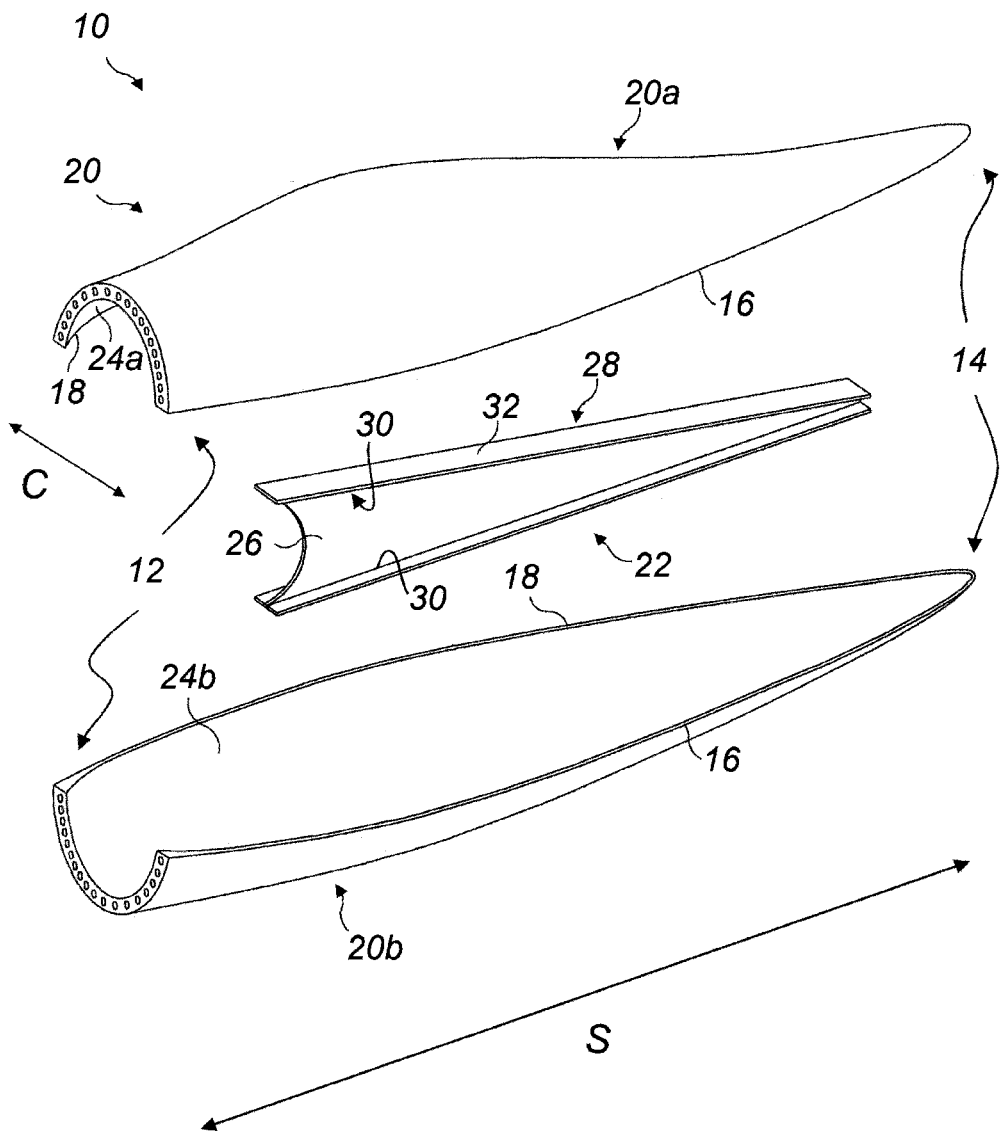
FIG. 1 is a schematic exploded view of a wind turbine blade.

FIG. 1 is a schematic exploded view of a wind turbine blade 10. The blade 10 extends longitudinally in a spanwise direction(S) between a root end 12 and a tip end 14, and in a chord wise direction (C) between a leading edge 16 and a trailing edge 18. The blade 10 comprises an outer shell 20 which may be formed of a first (e.g. windward) half shell 20a and a second (e.g. leeward) half shell 20b. When the half shells 20a, 20b are connected together, the outer shell 20 defines a substantially hollow interior.

The blade 10 further comprises a shear web 22 that extends longitudinally in the spanwise direction(S) inside the outer shell 20, i.e. inside the hollow interior of the blade 10. The shear web 22 forms part of a spar structure which is configured to absorb bending and torsional loads experienced by the blade 10 in use. As such, the shear web 22 is connected between inner surfaces 24a, 24b of the outer shell 20.

The shear web 22 comprises a longitudinally-extending web panel 26 and one or more mounting flanges 28. As shown in FIG. 1, the shear web 22 preferably comprises two mounting flanges 28. Each mounting flange 28 extends along a longitudinal edge 30 of the web panel 26 and transverse to the web panel 26.

Figure 2:
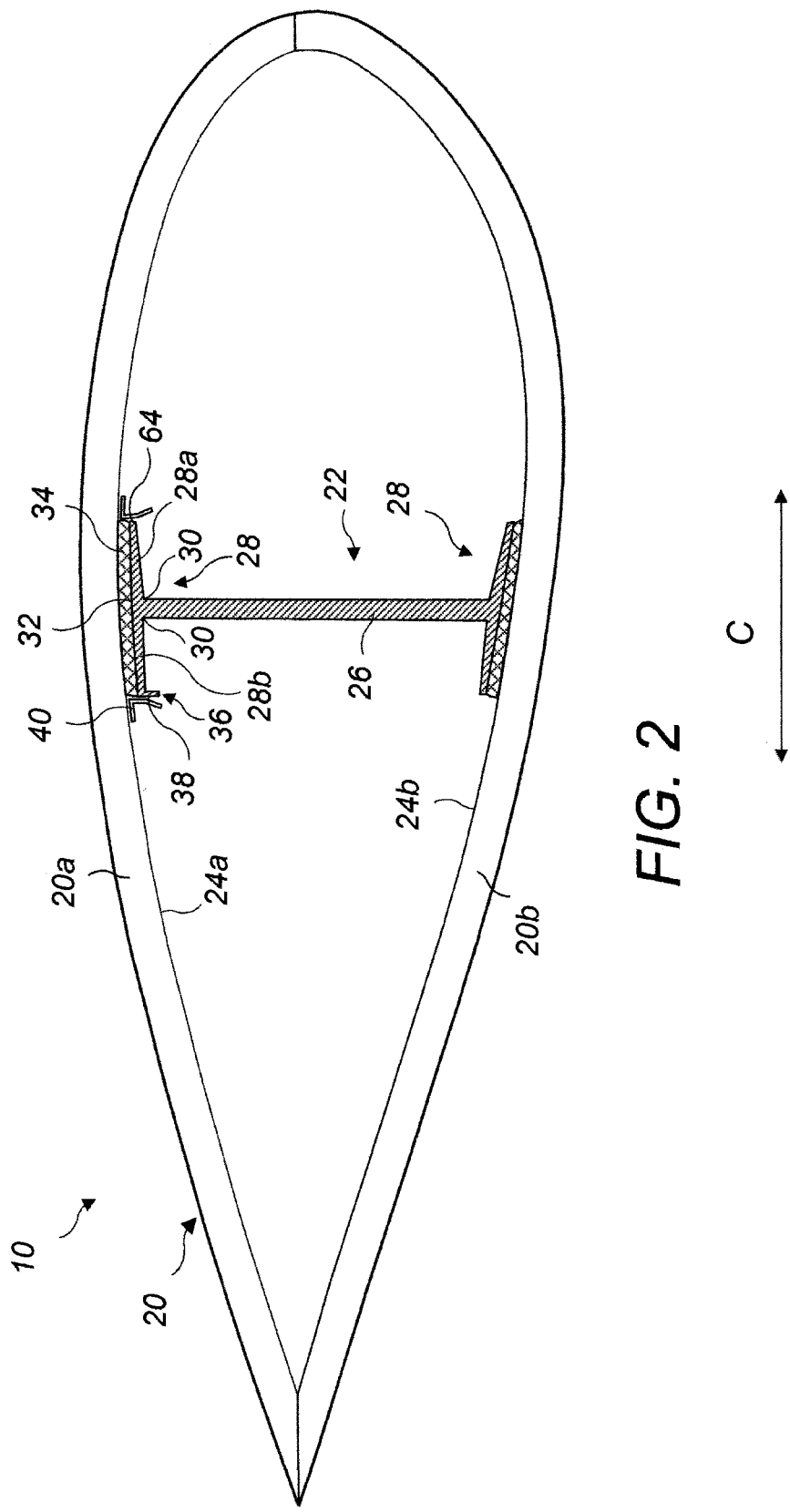
FIG. 2 is a schematic cross-sectional view of the wind turbine blade.

Referring additionally to FIG. 2, which shows a schematic cross-sectional view of the blade 10 and shear web 22, the mounting flange 28 comprises a first portion 28a extending on a first side of the web panel 26 and a second portion 28b extending on a second side of the web panel 26. The first and second portions 28a, 28b of the mounting flange 28 together define a mounting surface 32 configured for connecting the shear web 22 to the inner surface 24a, 24b of the shell 20, for example by means of adhesive 34.

The second portion of the mounting flange 28b comprises a datum feature 36 extending transverse to the mounting surface 32. The datum feature 36 defines an edge 38 of the second portion of the mounting flange 28b and thereby facilitates improved alignment when positing the shear web 22 inside the outer shell 20 during manufacture of the blade 10. In some examples, the blade 10 may comprise a web locator 40 arranged on the inner surface 24a, 24b of the outer shell 20, and the datum feature 36 may be configured to abut a guide structure of the web locator 40 to accurately position the shear web 22 within the shell 20 when manufacturing the blade 10.

As shown in FIG. 2, the datum feature 36 preferably extends away from the mounting surface 32. The datum feature 36 therefore does not obstruct the connection between the mounting flange 28 and the of the outer shell 20. Whilst the second portion of the mounting flange 28b comprises a datum feature 36, in some examples the first portion of the mounting flange 28a may be substantially planar, i.e. may not comprise a datum feature. Such a configuration may facilitate a simpler shear web manufacturing process.

The datum feature 36 is preferably integrally formed with the second portion of the mounting flange 28b. Further, in some examples the mounting flange 28 and web panel 26 may be integrally formed, such that the complete shear web 22 may be manufactured in a single process. The shear web 22 may be manufactured using a mould 44 as will now be described with reference to FIGS. 3 to 4b, and following a method as will be described below with reference to FIGS. 5a to 5e.

Figure 3:
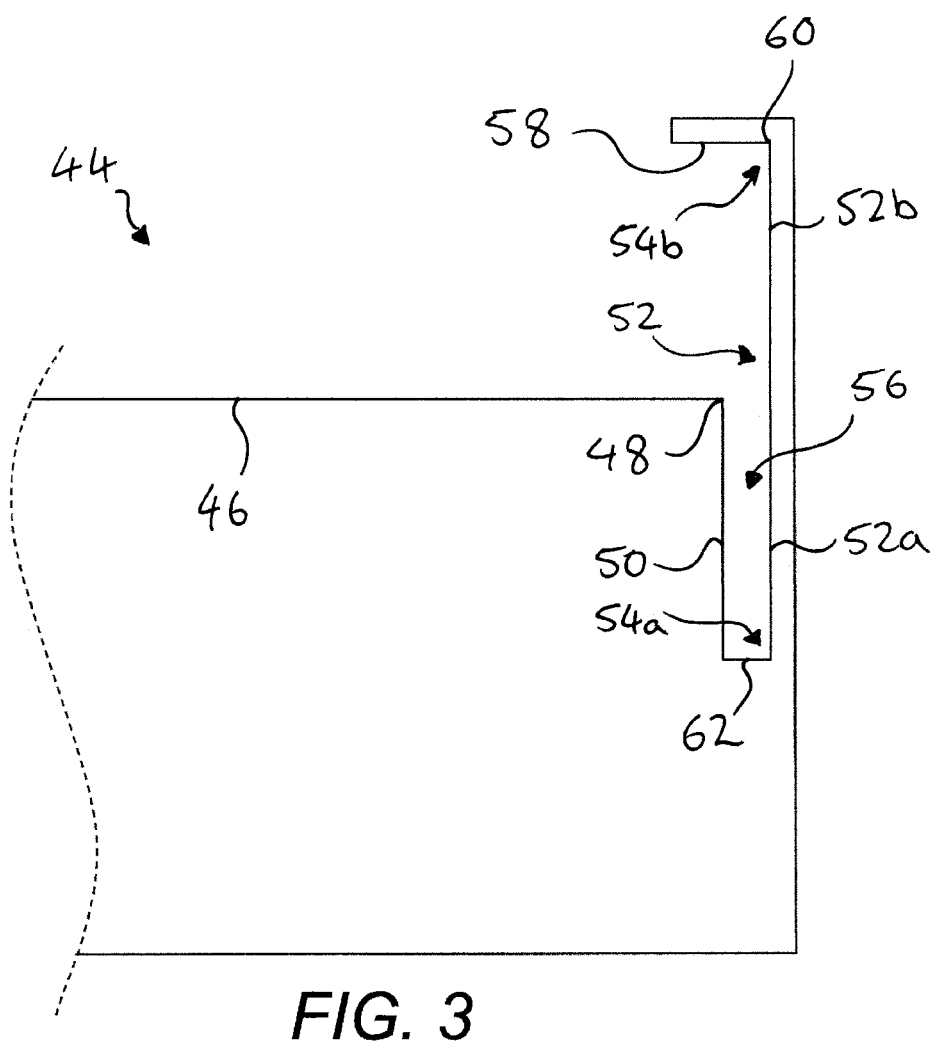
FIG. 3 is a schematic cross-sectional view of an example of a mould configured to form a wind turbine blade shear web.

FIG. 3 shows a schematic cross-sectional view of a mould 44 for making the shear web 22. The mould 44 comprises a longitudinally-extending main surface 46 shaped to form the web panel 26 (the main surface 46 extends into the plane of the page in FIG. 3). The main surface 46 has a longitudinal edge 48, and a side surface 50 of the mould 44 extends downwards from the longitudinal edge 48 of the main surface 46. As such, the side surface 50 is arranged transverse to the main surface 46.

The mould 44 also includes a base surface 52 arranged transverse to the main surface 46 and spaced apart from the side surface 50. The base surface 52 is preferably configured to form the mounting surface 32 of the mounting flange 28. With the mould 44 in a typical orientation, i.e. with the main surface 46 substantially horizontal, a first portion 52a of the base surface 52 extends below the main surface 46 to a first end 54a of the base surface 52. The first portion of the base surface 52a is spaced apart from the side surface 50 to define a mould cavity 56 between the side surface 50 and the first portion of the base surface 52a, and the mould cavity 56 is configured to form the first portion of the mounting flange 28a.

A second portion 52b of the base surface 52 extends above the main surface 46 of the mould 44 to a second end 54b of the base surface 52. Further, a datum-forming surface 58 extends transversely from the second end 54b of the base surface 52. As such, the datum-forming surface 58 defines a longitudinal edge 60 at an intersection of the datum-forming surface 58 and the second portion of the base surface 52b.

The datum-forming surface 58 and the second portion 52b of the base surface are configured to form the second portion of the mounting flange 28b. In particular, the datum-forming surface 58 is configured to define the longitudinal edge 38 of the second portion of the mounting flange 28b. For example, the datum-forming surface 58 is preferably configured to form the datum feature 36 of the shear web 22. In preferred examples, the datum-forming surface 58 may be angled at 90 degrees or less relative to the second portion of the base surface 52b. Accordingly, in such examples the datum-forming surface 58 may define a maximum width of the mounting flange 28. Similarly, the longitudinal edge 60 at the intersection may define a maximum width of the mounting surface 32 formed by the base surface 52 of the mould 44.

As shown in FIG. 3, the first end 54a of the base surface 52 may be connected to the side surface 50 via an end surface 62 in some examples. The end surface 62 is preferably configured to define a longitudinal edge 64 of the first portion of the mounting flange 28a (as shown in FIG. 2). The maximum width of the mounting flange 28, i.e. the width between the longitudinal edges 64, 38 of the first and second portions of the mounting flange 28a, 28b, may therefore be defined by the separation between the end surface 62 and the datum-forming surface 58 in some examples.

Figure 4A:
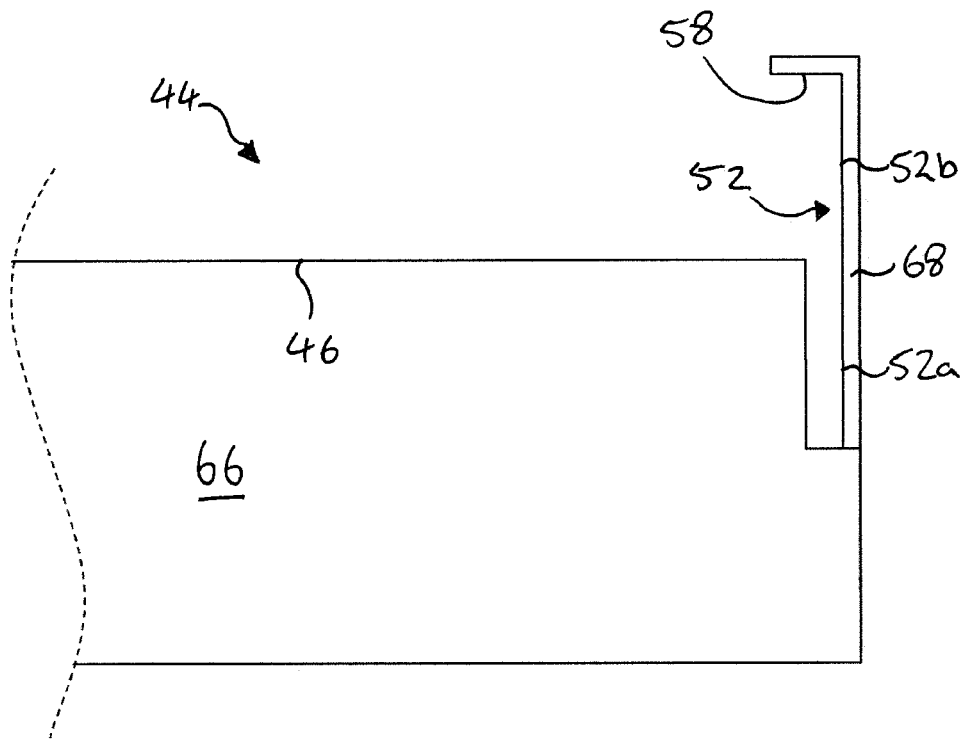
FIGS. 4a and 4b are schematic cross-sectional views of further examples of moulds configured to form the wind turbine blade shear web.
Figure 4B:
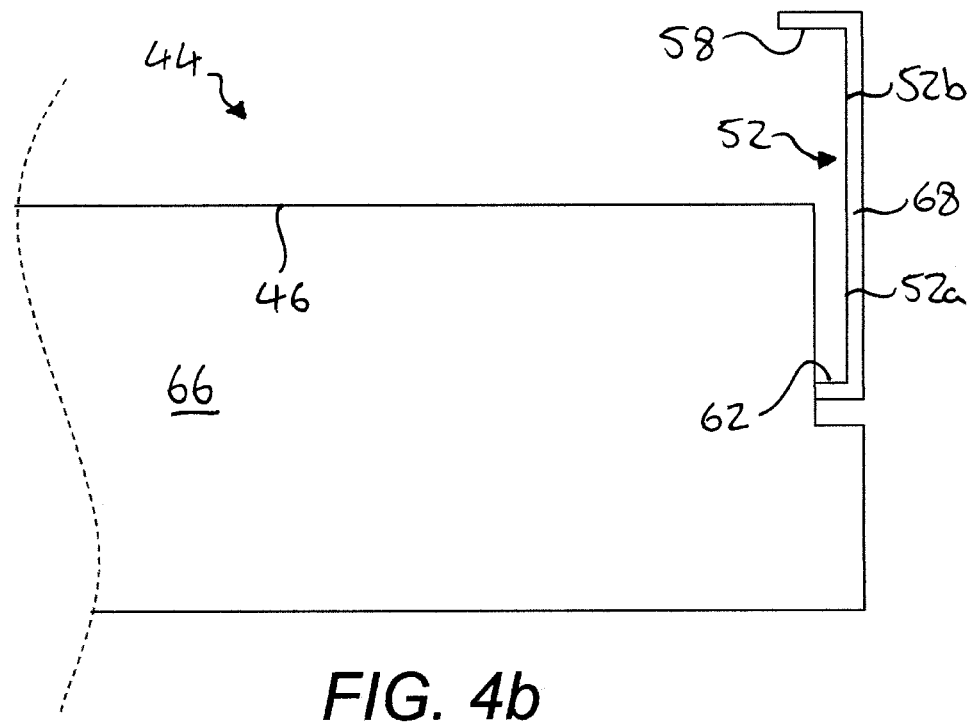

FIGS. 4a and 4b show further examples of the mould 44 in schematic cross-sectional views. The features of the mould 44 previously described with reference to FIG. 3 are equally present in the mould 44 shown in each of FIGS. 4a and 4b, and description of equal features will not be repeated here for conciseness.

In some examples, as shown in FIGS. 4a and 4b, the mould 44 may comprise a main mould portion 66 and one or more separable mould elements 68. The separable mould elements 68 may be separable from, and fixable to, the main mould portion 66. The main mould portion 66 preferably defines the main mould surface 46, and the or each separable mould element 68 may define at least one of the base surface 52 and the datum-forming surface 58. For example, with reference to FIG. 4a, a separable mould element 68 may define both the base surface 52 and the datum-forming surface 58. As shown in FIG. 4b, a separable mould element 68 may additionally define the end surface 62. In other examples (not shown in the figures) each of the datum-forming surface 58, the end surface 62, and the first and second portions of the base surface 52a, 52b may be defined by different separable mould elements 68.

A method of making a wind turbine blade shear web 22 using a mould 44 as previously described, will now be described with reference to the remaining figures.

Figure 5A:
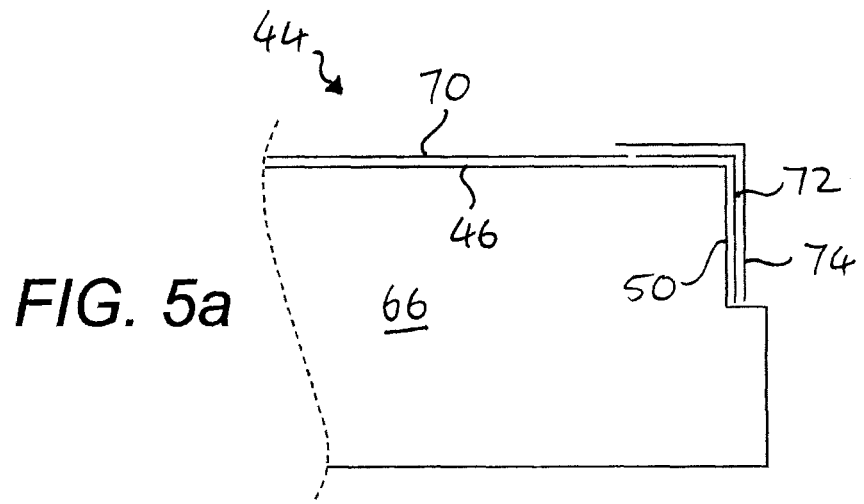
FIGS. 5a to 5e schematically illustrate stages in a method of making the shear web.

Referring initially to FIG. 5a, one or more layers of fibrous material 70 may be arranged on the main mould surface 46 to form the web panel 26. Whilst not shown in the figures, in some examples the method may include arranging core material, such as foam or balsa, on or between the layers of fibrous material 70 in a sandwich configuration to form the web panel 26.

One or more layers of fibrous material 72 are also arranged in the mould cavity 56 between the side surface 50 and the first portion of the base surface 52a to form the first portion of the mounting flange 28a. In examples such as that shown in FIGS. 5a to 5e, wherein the mould 44 comprises a separable mould element 68 defining the base surface 52, the fibrous material 72 is preferably arranged with the side surface 50 before arranging the or each separable mould element 68 with the main portion 66 of the mould 44. In preferred examples, at least one layer of fibrous material 72 may be arranged to extend over a portion of both the main surface 46 and the side surface 50. The method may also comprise arranging at least a portion of one or more base layers of fibrous material 74 with the fibrous material 72 arranged with the side surface 50 of the mould 44.

Figure 5B:
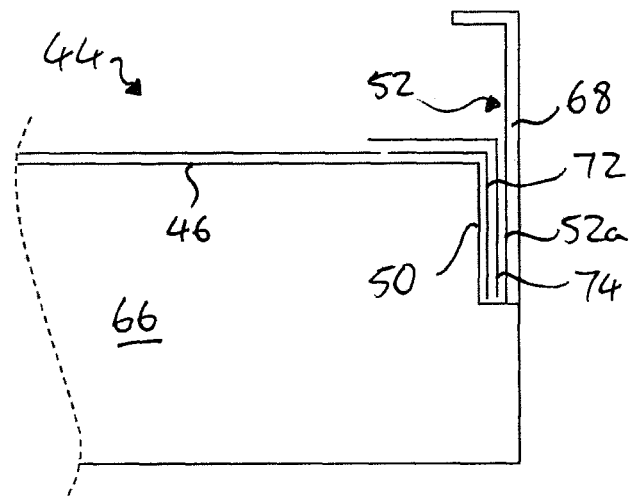

With reference to FIGS. 5a and 5b, the fibrous material 72 initially arranged with the side surface 50 prior to arranging the separable mould element 68 with the main mould portion 66 may be sandwiched in the mould cavity 56 between the side surface 50 and first portion of the base surface 52a when the separable mould element 68 is arranged. One or more base layers of fibrous material 74 may also be arranged against the first portion of the base surface 52a following arrangement of the separable mould element 68 with the main portion 66.

Figure 5C:
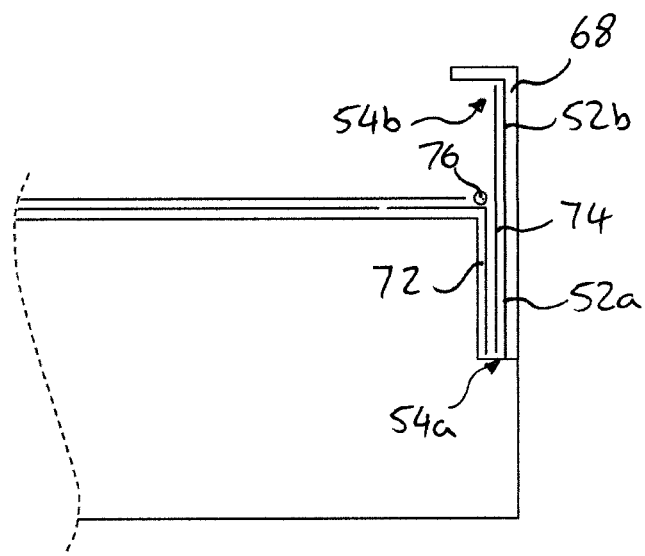

As shown in FIG. 5c, the or each base layer of fibrous material 74 may be arranged against the second portion of the base surface 52b following arrangement of the separable mould element 68. For example, the base layers 74 may be arranged to extend between the first and second ends 54a, 54b of the base surface 52. Further, in some examples the method may comprise arranging filler material 76 in the mould 44 on top of the fibrous material 72 arranged to form the first portion of the mounting flange 28a.

Figure 5D:
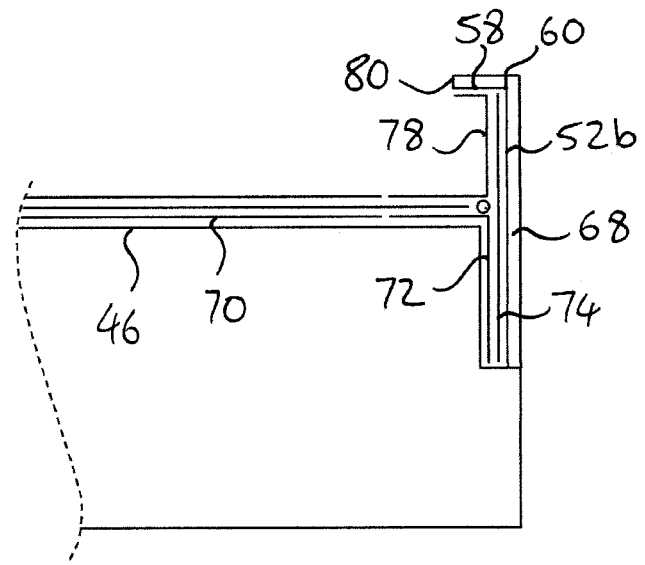

Referring now to FIG. 5d, the method further comprises arranging one or more layers of fibrous material 78 against the second portion of the base surface 52b and the datum-forming surface 58 to form the second portion of the mounting flange 28b. Preferably the fibrous material 78 is arranged following arrangement of the separable mould element 68 in examples where the mould 44 comprises one or more separable mould elements 68. At least one layer of fibrous material 78 may be arranged to extend over a portion of both the main surface 46 and the second portion of the base surface 52b in preferred examples.

Still with reference to FIG. 5d, at least one layer of fibrous material 78 is arranged to extend across the longitudinal edge 60 at the intersection of the second portion of the base surface 52b and the datum-forming surface 58. In some examples (not shown) at least one layer of fibrous material 78 may be arranged to run out of the mould 44 beyond a distal edge 80 of the datum-forming surface 58.

After arranging the fibrous material 70, 72, 74, 78 in the mould 44, the fibrous material may be integrated with resin to form a shear web 22 comprising an integrally formed mounting flange 28. For example, the method may comprise a vacuum assisted resin transfer moulding (VARTM) process to supply resin to the fibrous material lay-up.

Figure 5E:
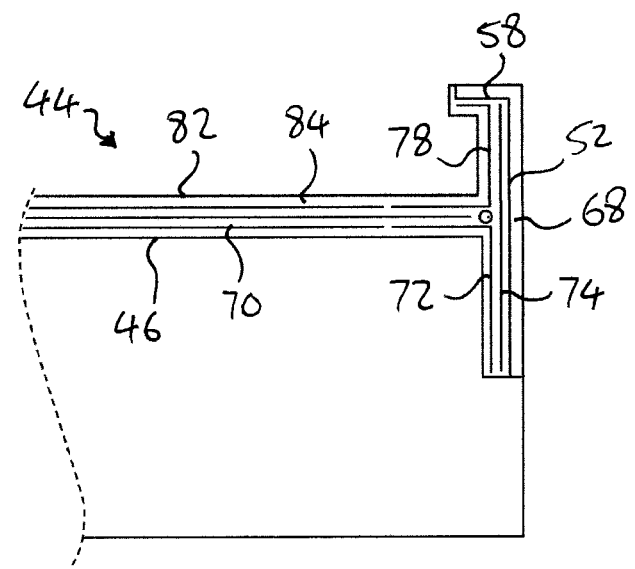

Referring finally to FIG. 5e, a VARTM process may involve arranging a vacuum bag 82 over the layers of fibrous material 70, 72, 74, 78 in the mould 44 and sealing the vacuum bag 82 to the mould 44. As such, a second mould cavity 84 may be defined between the vacuum bag 82, the main surface 46, the base surface 52, and the datum-forming surface 68. The second mould cavity 84 is preferably configured to form the second portion of the mounting flange 28b.

Whilst the method described above includes the use of a mould 44 comprising a separable mould element 68, it will be appreciated that the same method may be used to make a shear web 22 in a single-piece mould 44, such as that shown in FIG. 3, i.e. without separable mould elements 68. In such an example the fibrous material 70, 72, 74, 78 may be arranged in substantially the same way without limiting the order of the process with the requirement of arranging a separable mould element 68 with the main mould portion 66 prior to arranging some of the fibrous material.

Whilst the fibrous material 70, 72, 74, 78 is shown in the accompanying figures as a single layer, it will be appreciated that the figures merely show schematic representations of various examples. As such, single layers of fibrous material 70, 72, 74, 78 are shown schematically in the figures for clarity. It will however be understood that the fibrous material 70, 72, 74, 78 shown schematically in the accompanying figures may comprise one or more layers of fibrous material.

It will be appreciated that the description provided above serves to demonstrate a plurality of possible examples of the present invention. Features described in relation to any of the examples above may be readily combined with any other features described with reference to different examples without departing from the scope of the invention as defined in the appended claims.

Further, it will be appreciated that the above description and accompanying figures are provided merely as an example. Many alternatives to the specific examples described above are therefore possible without departing from the scope of the invention as defined in the appended claims.

The invention claimed is:

1. A mould for making a wind turbine blade shear web, the shear web comprising a longitudinally-extending web panel and a mounting flange extending along a longitudinal edge of the web panel and transverse to the web panel, the mounting flange comprising a first portion extending on a first side of the web panel and a second portion extending on a second side of the web panel, the mould comprising:
a longitudinally-extending main surface shaped to form the web panel, the main surface having a longitudinal edge;
a side surface arranged transverse to the main surface and extending downwards from the longitudinal edge of the main surface;
a base surface arranged transverse to the main surface and spaced from the side surface, the base surface having a first portion extending below the main surface to a first end of the base surface and a second portion extending above the main surface to a second end of the base surface, wherein the first portion of the base surface is spaced from the side surface to define a mould cavity between the side surface and the first portion of the base surface, the mould cavity being configured to form the first portion of the mounting flange; and
a datum-forming surface extending transversely from the second end of the base surface and defining a longitudinal edge at an intersection of the second portion of the base surface and the datum-forming surface, the second portion of the base surface and the datum-forming surface being configured to form the second portion of the mounting flange, and the datum-forming surface being configured to define a longitudinal edge of the second portion of the mounting flange.

2. The mould of claim 1, wherein the first end of the base surface is connected to the side surface via an end surface configured to define a longitudinal edge of the first portion of the mounting flange.

3. The mould of claim 1, wherein the datum-forming surface is angled at 90 degrees or less relative to the second portion of the base surface.

4. The mould of claim 1, wherein the mould comprises a main mould portion defining the main surface, and one or more separable mould elements defining at least one of the base surface and the datum-forming surface.

5. A method of making a wind turbine blade shear web, the shear web comprising a longitudinally-extending web panel and a mounting flange extending along a longitudinal edge of the web panel and transverse to the web panel, the mounting flange comprising a first portion extending on a first side of the web panel and a second portion extending on a second side of the web panel, the method comprising:
providing a mould comprising:
a longitudinally-extending main surface having a longitudinal edge,
a side surface arranged transverse to the main surface and extending downwards from the longitudinal edge of the main surface,
a base surface arranged transverse to the main surface and spaced from the side surface, the base surface having a first portion extending below the main surface to a first end of the base surface and a second portion extending above the main surface to a second end of the base surface, wherein the first portion of the base surface is spaced from the side surface to define a mould cavity between the side surface and the first portion of the base surface; and
a datum-forming surface extending transversely from the second end of the base surface and defining a longitudinal edge at an intersection of the second portion of the base surface and the datum-forming surface;
arranging one or more layers of fibrous material on the main surface of the mould to form the web panel;
arranging one or more layers of fibrous material in the mould cavity between the side surface and the first portion of the base surface to form the first portion of the mounting flange;
arranging one or more layers of fibrous material against the second portion of the base surface and the datum-forming surface to form the second portion of the mounting flange, wherein at least one layer of fibrous material is arranged to extend across the longitudinal edge at the intersection of the second portion of the base surface and the datum-forming surface; and
integrating the fibrous material with resin to form a shear web comprising an integrally formed mounting flange.

6. The method of claim 5, wherein the mould comprises a main mould portion defining the main surface, and one or more separable mould elements defining at least one of the base surface and the datum-forming surface, and
wherein the method comprises arranging the or each separable mould element with the main mould portion prior to arranging the one or more layers of fibrous material against the second portion of the base surface and the datum-forming surface.

7. The method of claim 6, wherein arranging one or more layers of fibrous material in the mould cavity comprises first arranging one or more layers of fibrous material with the side surface of the mould, and subsequently arranging the or each separable mould element with the main mould portion such that said fibrous material is sandwiched in the mould cavity between the side surface and first portion of the base surface.

8. The method of claim 7, further comprising arranging at least a portion of one or more base layers of fibrous material with the one or more layers of fibrous material arranged with the side surface of the mould,
subsequently arranging the or each separable mould element with the main mould portion, and
subsequently arranging the or each base layer of fibrous material with the base surface to extend between the first and second ends of the base surface.

9. The method of claim 5, wherein arranging one or more layers of fibrous material against the second portion of the base surface and the datum-forming surface further comprises arranging at least one layer of fibrous material to run out of the mould beyond a distal edge of the datum-forming surface.

10. The method of claim 5, further comprising arranging at least one layer of fibrous material to extend over a portion of both the main surface and the side surface, and arranging at least one layer of fibrous material to extend over a portion of both the main surface and the second portion of the base surface.

11. The method of claim 5, further comprising arranging a vacuum bag over the layers of fibrous material in the mould and sealing the vacuum bag to the mould such that a second mould cavity is defined between the vacuum bag, the main surface, the base surface, and the datum-forming surface, the second mould cavity being configured to form the second portion of the mounting flange.

12. A wind turbine blade comprising an outer shell and a shear web connected between inner surfaces of the outer shell, the shear web comprising a longitudinally-extending web panel and a mounting flange extending along a longitudinal edge of the web panel and transverse to the web panel, the mounting flange comprising a first portion extending on a first side of the web panel and a second portion extending on a second side of the web panel, the first and second portion of the mounting flange together defining a mounting surface for connection to an inner surface of the outer shell,
  wherein the second portion of the mounting flange comprises a datum feature extending transverse to the mounting surface and defining an edge of the second portion of the mounting flange.

13. The wind turbine blade of claim 12, wherein the datum feature extends away from the mounting surface.

14. The wind turbine blade of claim 12, wherein the first portion of the mounting flange is substantially planar.

15. The wind turbine blade of claim 12, wherein the datum feature is integrally formed with the second portion of the mounting flange.

* * * * *